(12) United States Patent
Bair et al.

(10) Patent No.: US 11,667,479 B2
(45) Date of Patent: Jun. 6, 2023

(54) METHOD AND APPARATUS FOR REMOVING AN ARTICLE FROM A TRAY

(71) Applicant: Dematic Corp., Grand Rapids, MI (US)

(72) Inventors: Matthew Bair, Caledonia, MI (US); Nolan R. Pilarz, Ada, MI (US); Rustin Fike, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 17/410,305

(22) Filed: Aug. 24, 2021

(65) Prior Publication Data

US 2022/0055843 A1 Feb. 24, 2022

Related U.S. Application Data

(60) Provisional application No. 63/069,244, filed on Aug. 24, 2020.

(51) Int. Cl.
 *B65G 47/32* (2006.01)
(52) U.S. Cl.
 CPC ...... *B65G 47/32* (2013.01); *B65G 2201/0258* (2013.01)
(58) Field of Classification Search
 CPC ............ B65G 47/32; B65G 2201/0258; B65G 15/50; B65G 47/646; B65G 47/766
 See application file for complete search history.

(56) References Cited

U.S. PATENT DOCUMENTS

| 6,247,576 | B1 | 6/2001 | Bonnet |
| 7,047,710 | B2 | 5/2006 | Winkler |
| 7,097,045 | B2 | 8/2006 | Winkler |
| 7,866,936 | B2 * | 1/2011 | Schuck ................ B65G 65/00 414/790 |
| 8,763,785 | B2 * | 7/2014 | Schwardt .............. B65G 47/52 198/597 |
| 10,843,252 | B2 * | 11/2020 | Woidasky ............. B21D 43/20 |
| 2004/0007492 | A1 | 1/2004 | Winkler |
| 2009/0236251 | A1 | 9/2009 | Berdelle-Hilge et al. |

(Continued)

FOREIGN PATENT DOCUMENTS

CN 111606021 A 9/2020

OTHER PUBLICATIONS

International Search Report and Written Opinion of the International Searching Authority from corresponding Patent Cooperation Treaty (PCT) Application No. PCT/IB2021/057767, indicated completed on Oct. 19, 2021.

*Primary Examiner* — Lynn E Schwenning
(74) *Attorney, Agent, or Firm* — Gardner, Linn, Burkhart & Ondersma LLP (57) ABSTRACT

A de-traying method and apparatus for removing articles from trays, each of the trays having a base, a rim around the base and an opening in said base and a bottom covering said opening and liftable from said base. A tray supporting an article is transported to a detraying assembly where the article is detrayed by elevating the bottom at least to the level of the tray rim with an article lifter having a lifting base and a plurality of lifting blocks. The lifting blocks are sized and arranged to engage the tray bottom through the opening in response to the lifting base being elevated, and to maintain orientation of the tray with at least one of said blocks positioned outside of the tray adjacent the rim. The article is displaced off of the elevated tray bottom.

23 Claims, 6 Drawing Sheets

(56) References Cited

U.S. PATENT DOCUMENTS

| | | | |
|---|---|---|---|
| 2011/0061995 A1* | 3/2011 | Huff | B65G 47/42 198/463.3 |
| 2016/0096653 A1 | 4/2016 | Stratton et al. | |
| 2019/0047795 A1 | 2/2019 | Fujio | |

* cited by examiner

METHOD AND APPARATUS FOR REMOVING AN ARTICLE FROM A TRAY

CROSS REFERENCE TO RELATED APPLICATION

The present application claims priority of U.S. provisional application Ser. No. 63/069,244, filed Aug. 24, 2020, which is hereby incorporated herein by reference in its entirety.

BACKGROUND OF THE INVENTION

The present invention is directed to a material handling system and, in particular, to a method of and apparatus for removing an article from a carrier, also known as a tray. Such method is also referred to as de-traying. The following description may refer to an article as a package or product, but intends to use such terms interchangeably.

Trays are useful in material handling systems. Since they are of uniform size, or a limited number of sizes, they allow automated equipment, such as automated warehouses and the like to be able to handle a standardized load(s). Also, the use of trays eliminates concerns with the walls of the article having uneven or unstable bottoms which can interfere with transport by conventional conveyors.

One difficulty with the use of trays is the de-traying process. Each tray necessarily has an elevated side surrounding the tray in order to keep the product contained on the tray. In order to remove the product from the tray there is a necessity to elevate the product sufficiently to clear the side of the tray when removing the product from the bottom of the tray. While this can be accomplished either by elevating the product while keeping the tray stationary or by keeping the product stationary and lowering the tray, the unloading process is substantially the same in principle. The process must be carried out at sufficient speed to keep up with conventional material handling system throughput and not add substantial cost to the system. Of course it must be carried out repeatedly without damage to the article or causing an article jamb.

SUMMARY OF THE INVENTION

The present invention is useful with trays of at least two different sizes. By having multiple sized trays, the tray size can be better matched to the size of the article being handled. This reduces wasted "space" in the system by avoiding oversized trays handling small articles yet having sufficient capability to handle larger sized items. The present invention also has the capability of de-traying articles from trays with either the long side of the tray leading or short side of the tray leading in the conveyance direction. This is useful because automated load calculating algorithms for automated palletizers are capable of optimizing load placement by choosing not only the location of the article on the load but also the orientation of the article. Thus the present invention provides a useful detraying method and apparatus which provides maximum flexibility by being capable of using multiple different sized trays and detraying such trays in multiple different orientations.

According to an aspect of the present invention, a de-traying method and apparatus for removing articles from trays, is useful with a plurality of trays, each of the trays having a base, a rim around the base and an opening in said base and a bottom covering said opening. The bottom is liftable from said base. A tray that is supporting an article on said bottom is transported to a detraying assembly. The article is detrayed at the detraying assembly by elevating the bottom at least to the level of the tray rim with an article lifter from below the tray. The article lifter includes a lifting base and a plurality of lifting blocks fixed to the lifting base. The lifting blocks are sized and arranged to engage the tray bottom through the opening in response to the lifting base being elevated. The lifting blocks are sized and arranged to maintain orientation of the tray with at least one of said blocks positioned outside of the tray adjacent the rim. The article is displaced off of the elevated tray bottom.

The tray may be elongated having long sides and short sides perpendicular to the long sides. The opening may be elongated having long sides parallel to the tray long sides and short sides parallel to the tray short sides. The lifting blocks may be sized and arranged to engage the tray bottom through said opening and to maintain orientation of the tray with at least one of said blocks positioned outside of the tray adjacent said rim regardless of orientation of tray short edge leading or long edge leading with respect to the direction of said transporting. Some of the trays may be small trays and some of the trays large trays that are larger than the small trays. Either a small tray or a large tray may be transported to the detraying apparatus with either the long side leading or the short side leading.

The conveyor may be a strip belt conveyor with a plurality of spaced apart narrow belts that are driven at a same speed and the lift blocks being sized and arranged to be between the belts with the lifting base elevated. The small trays may have a long edge the same length as the short edge of the large trays and have a short edge that is half the long edge of the large trays. The small trays may have an opening that is as long as the opening in the large tray opening is wide.

A de-traying method and apparatus for removing articles from trays, according to an aspect of the invention has a plurality of trays, each of the trays having a base and a bottom that is liftable from the base. Each of the trays further has a rim around the base and an opening in the base that is covered by the bottom. Some of the trays are large trays and some of the trays are small trays that are smaller than the large trays. The opening in the large trays is larger than the opening in the small trays. A tray that is supporting an article on the bottom is transported to a detraying assembly. The article is detrayed at the detraying assembly by elevating the bottom at least to the level of the tray rim with an article lifter from below the tray. The article lifter includes a lifting base and a plurality of blocks fixed to the lifting base. Some of the blocks are lifting blocks that are sized and arranged to engage the tray bottom through the opening in response to the lifting base being elevated and at least one of the blocks is a guide blocks that is sized and arranged to maintain orientation of the tray with the guide block positioned outside of the tray adjacent the rim. The blocks are sized and arranged on the lifting base wherein at least two of said blocks are lifting blocks and at least one of the blocks is a guide block whether the article is being detrayed from a large tray or a small tray and whether the article is being detrayed from a tray being oriented with its long edge leading or its short edge leading. The article is displaced off of the elevated tray bottom.

The blocks may be arranged in ranks with at least one of the blocks being a base rank, at least two of said blocks being of an inner rank with respect to said base rank block and at least two of said blocks being of an outer rank that are outside of said inner rank block with respect to said base rank block. A large tray may be detrayed with the base rank block, the inner rank blocks and at least one of said outer rank blocks being lifting blocks and the other of the outer rank blocks being a guide block. A small tray may be detrayed with the base rank block and at least one of said inner rank blocks being lifting blocks and at least one of the inner rank blocks being a guide block. At least one of said outer rank blocks may be a guide block for detraying a small tray.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

A de-traying method and apparatus 10 is adapted to remove, or de-tray, an article A from a tray 12 in the direction indicated by the arrow marked "Divert". While it is preferable to carry only one article A on each tray, it is also possible to place two or more articles on each tray. Each of the trays 12 is elongated having a long side 13 and a short side 14 with a base 15 and a rim 16 around the base. A bottom 20 is floating within rim 16 and is liftable from below the base in a manner discussed in more detail below. Bottom 20 is a generally planar sheet with strengthening ribs 21 formed underneath as best seen in FIGS. 3-6. Tray 12 further including and an elongated opening 18 in base 15, with bottom 20 covering the opening. Tray 12 is either a large size shown in FIGS. 3 and 4 or a small size shown in FIGS. 5 and 6 that is smaller than the large tray. The small size trays are approximately one-half the size of a large size tray such that two small size trays positioned with long side 13 abutting are approximately the same size footprint as one large size tray.

Figure 4:
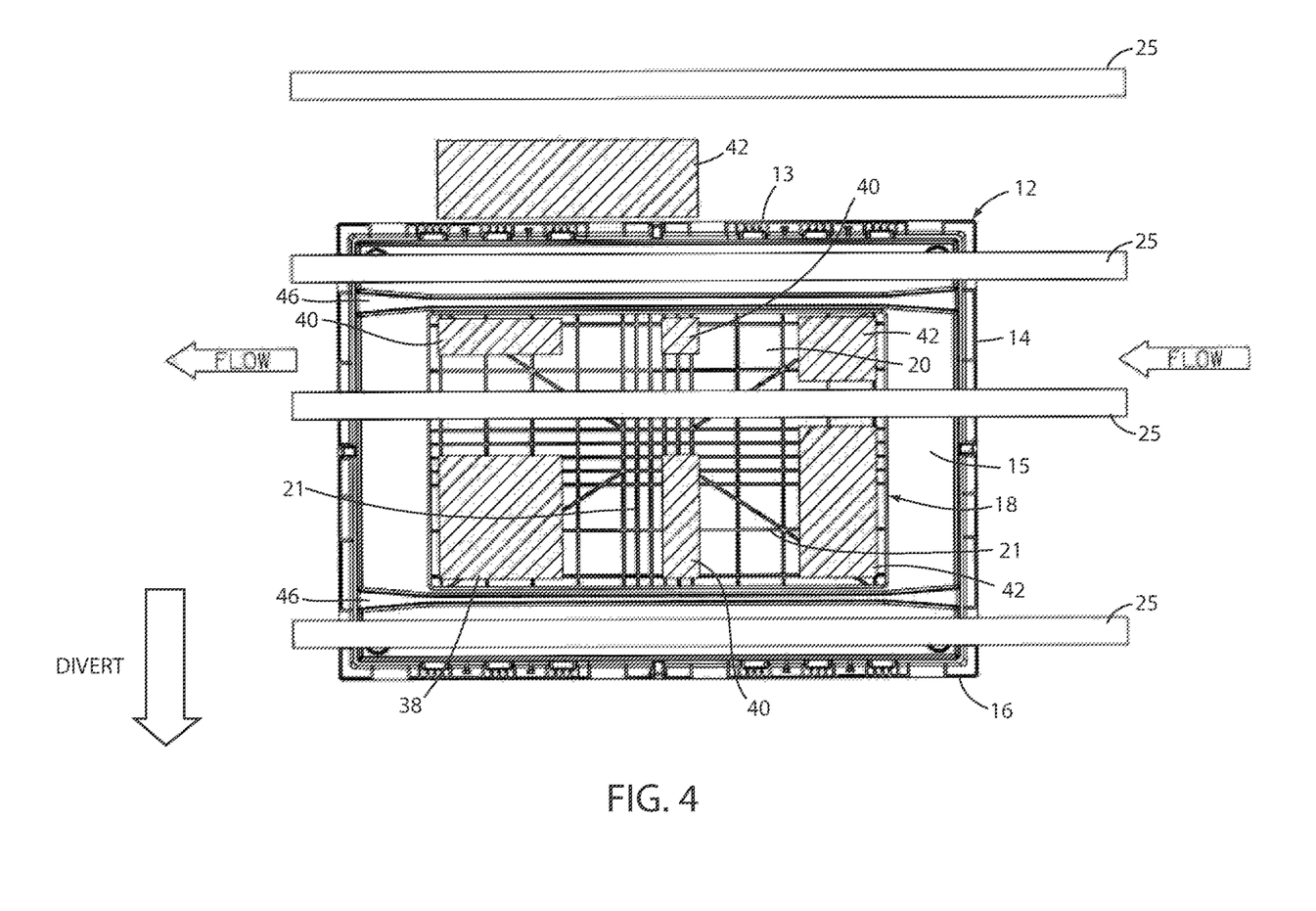
FIG. 4 is the same view as FIG. 3 illustrating the large tray oriented with its short edge leading.
Figure 5:
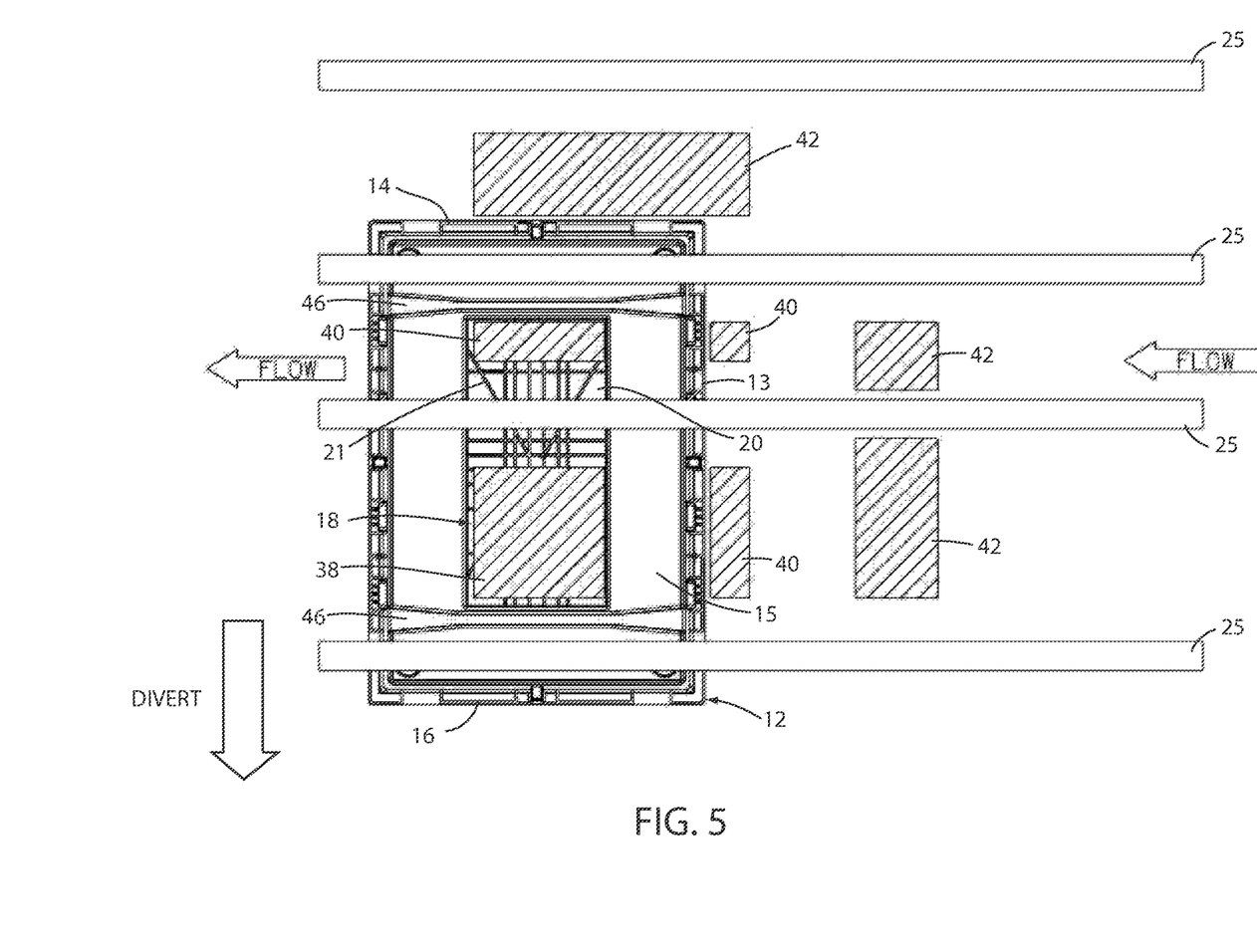
FIG. 5 is the same view as FIG. 3 illustrating a small tray oriented with its long edge leading.

One or more pockets 44 are formed on each of the sides 13, 14 of tray 12. Pockets 44 are adapted to be engaged by linearly actuated fingers (not shown) for use in storage and retrieval of the tray on a shelf as disclosed in detail in commonly assigned European patent application filed Aug. 24, 2020, entitled, SYSTEM FOR STORAGE OF GOODS CARRIERS, Serial Number EP20192434.7, the disclosure of which is hereby incorporated by reference in its entirety. Each tray 12 further includes a pair of parallel grooves 46 formed on a bottom surface of each tray 12. As is seen in FIG. 4, recessed grooves 46 formed in base 15 extend parallel the long side 13 of large trays. As seen in FIG. 5, grooves 46 extend parallel the short side 14 of small trays. Grooves 46 are configured to interface with guide strips (not shown) on storage shelves in order to stop the tray 12 from shifting position and/or orientation of the tray over time on the shelf, as disclosed in detail in commonly assigned European patent application filed Aug. 24, 2020, entitled SYSTEM FOR STORAGE OF GOODS CARRIERS, serial number EP20192437.0, the disclosure of which is hereby incorporated herein by reference in its entirety. Grooves 46 are flared at each end in order to guide the groove over the corresponding guide strip.

Figure 3:
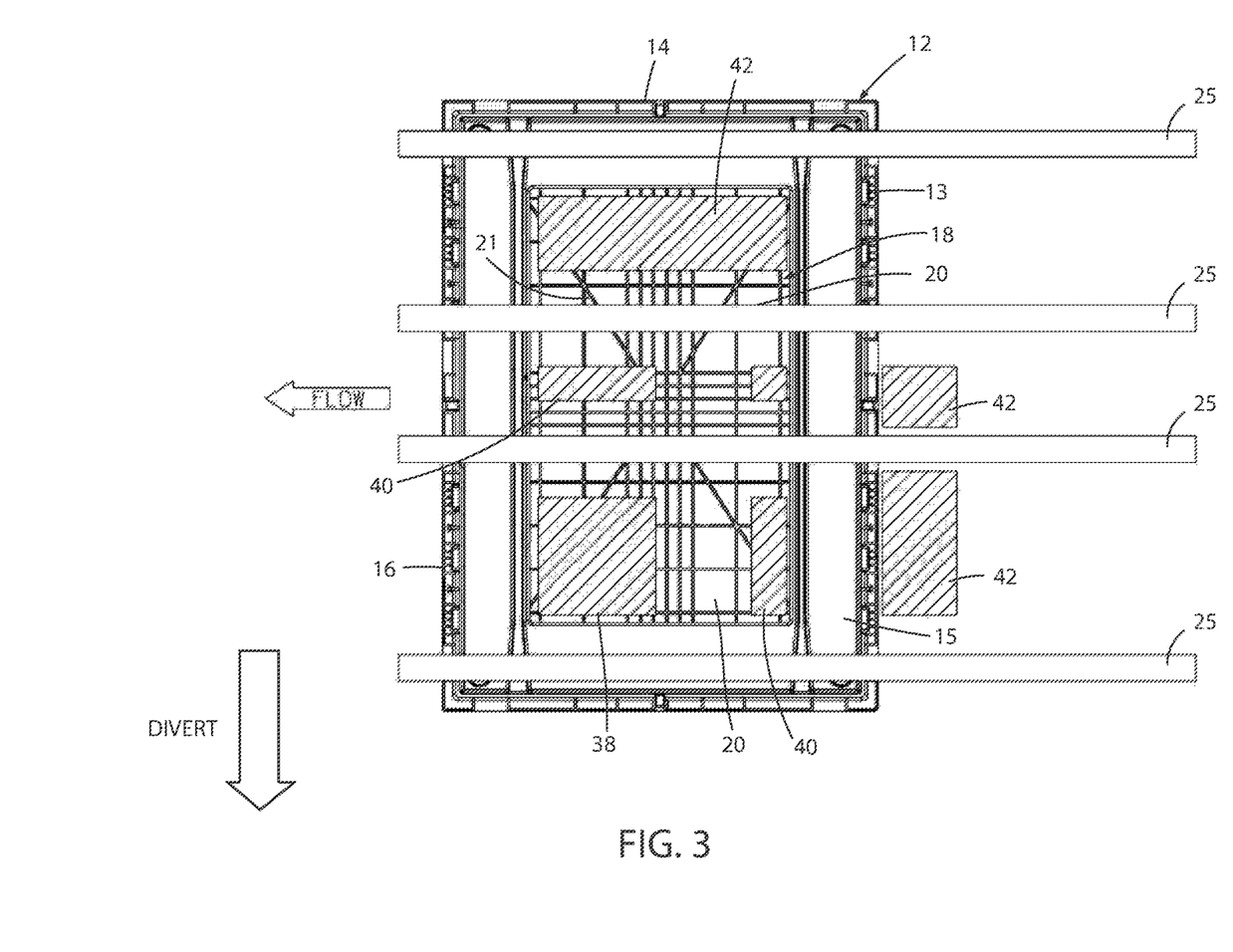
FIG. 3 is a bottom plan view taken in the direction III-III in Fig II illustrating a large tray oriented with its long edge leading.
Figure 6:
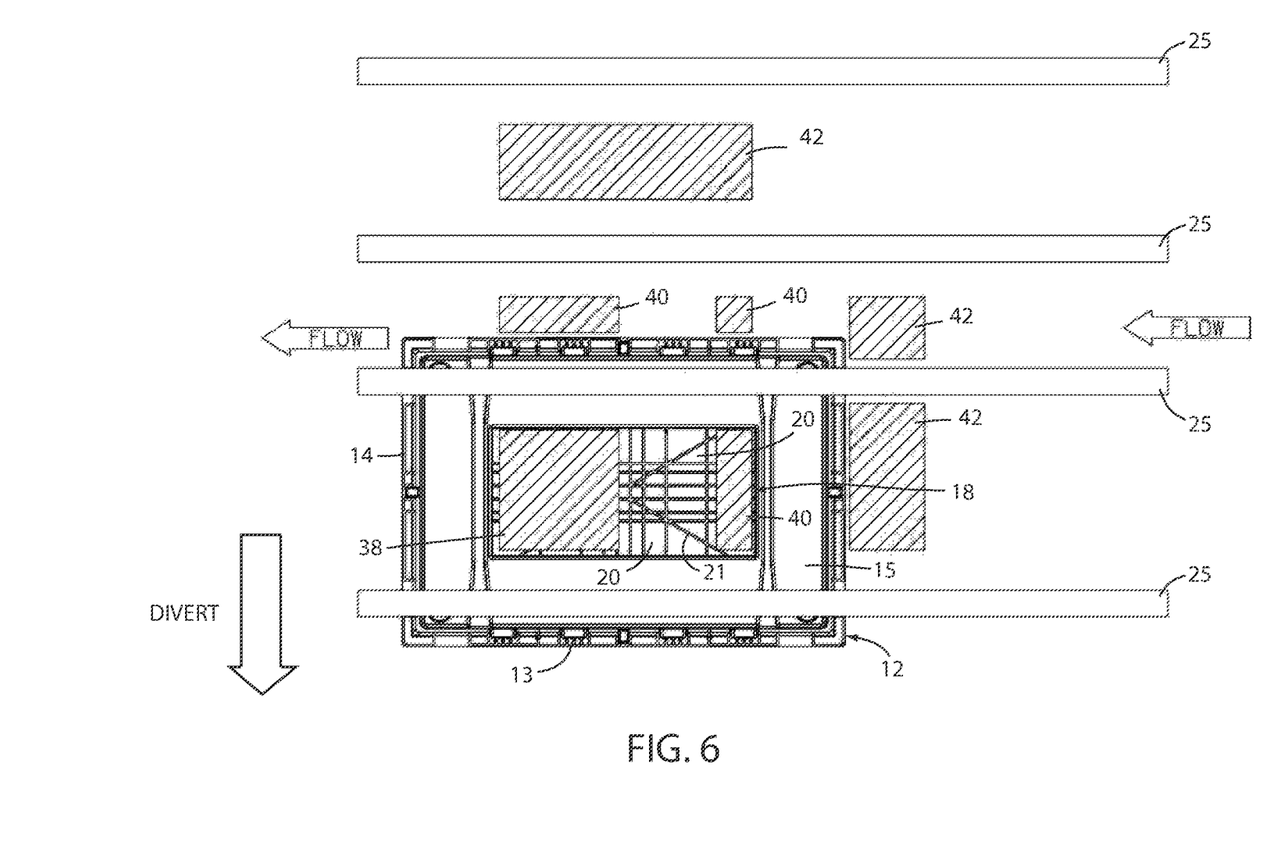
FIG. 6 is the same view as FIG. 3 illustrating the small tray oriented with its short edge leading.

Detraying apparatus 10 is supported by a frame 20 made up of a pair of spaced apart side-channels 22 which also support a transporting apparatus, such as a conveyor 24. Conveyor 24 transports trays 12 in the direction indicated by the "flow" arrow with either the long side leading as shown in FIGS. 3 and 5 or the short side leading as shown in FIGS. 4 and 6. Detraying apparatus 10 includes an article lifter 26 made up of a lifting base 32 and a plurality of blocks 36 fixed to the lifting base. Lifting base 32 is selectively elevated by an actuator (not shown) that may be pneumatically, hydraulically or electrically operated. Blocks 36 are of sizes and arrangements to elevate tray bottom 20 and to stabilize the tray during de-traying regardless of the size of the tray and the orientation of the tray. In particular, regardless of the size and orientation of the tray, at least two blocks 36, referred to as "lifting blocks", are elevated in opening 18 engaging the tray bottom 20 in response to the lifting base 32 being elevated and at least one of blocks 36, referred to as a "guide block", is positioned outside of the tray adjacent the rim to maintain orientation of the tray.

In the illustrated embodiment conveyor 24 is a strip belt conveyor with a plurality of spaced apart narrow belts 25 that are driven at a same speed. Blocks 36 are of sizes and arrangement to be between belts 25 when lifting base 32 is elevated. Other conveyor configuration such as rollers or wheels could be used. A diverter 28, such as a pusher, extends to divert the article A from the tray in the divert direction with moveable bottom in a raised state. Thus the article will pass over the rim 16. A tray rotator 30 upstream of detraying apparatus 10 selectively rotates the tray by 90 degrees if the tray is not in the orientation to off-load the article A in the orientation called for by the pallet load algorithm. Such tray rotator may be a selectively elevated pin that engages an opening at a leading edge of the tray to rotate the tray in response to forward motion of the tray or the like.

Blocks 36 are of a size and orientation for at least two of the blocks being lifting blocks to elevate moveable bottom 20 in a stable fashion regardless of the size and orientation of the tray. Blocks 36 are of a size and orientation for at least one of the blocks to be a guide block to be adjacent a rim outside of the tray to resist movement of the tray during de-traying regardless of the size and orientation of the tray. In the illustrated embodiment, this is accomplished by blocks 36 being arranged in ranks with at least one of the blocks 38 being a base rank, at least two of the blocks 40 being of an inner rank with respect to the base rank block and at least two of the blocks 42 being of an outer rank that are outside of the inner rank blocks with respect to the base rank block.

Figure 1:
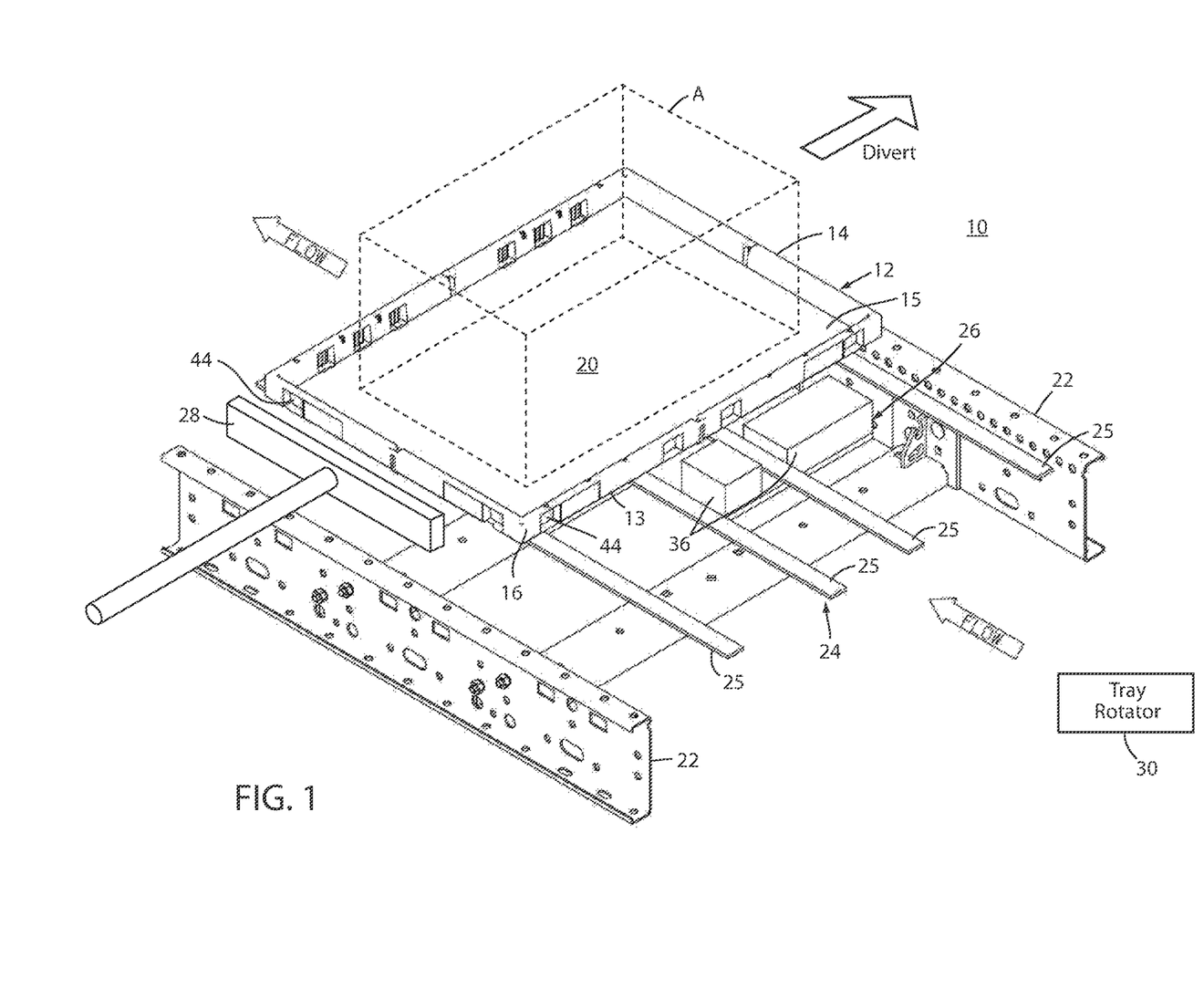
FIG. 1; is a perspective view of a method and apparatus for removing an article from a tray according to an embodiment of the invention.
Figure 2:
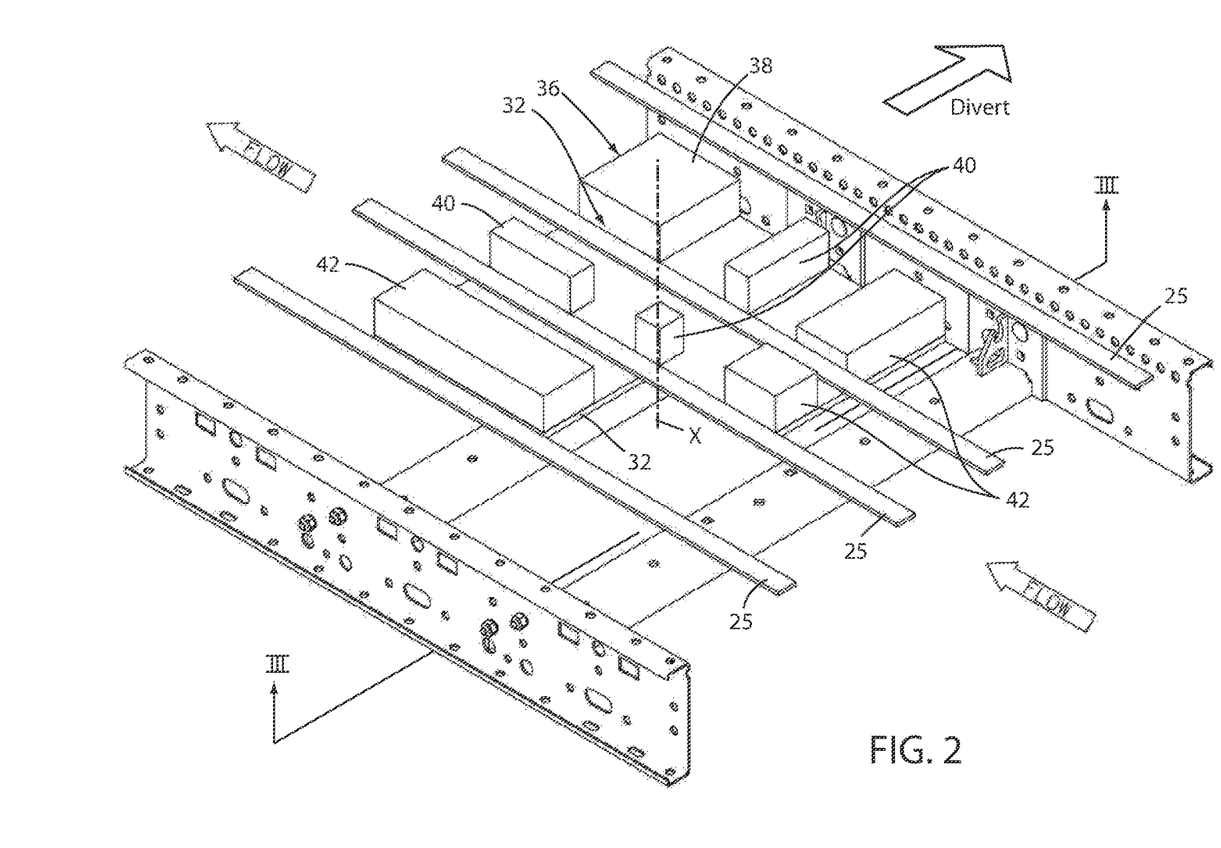
FIG. 2 is the same view as FIG. 1 with the tray removed to illustrate details of the detraying apparatus.

The blocks of one rank are a different size and shape from the blocks of a different rank. The blocks of each rank are generally symmetrical about an axis X that is at an angle of 45 degrees from the direction of conveyance as shown on FIG. 2. The blocks differ somewhat from being completely symmetrical, for example, since one block 42 in the outer rank is divided in order to accommodate a conveyor belt 25. A large tray 12 is detrayed with the base rank block 38, the inner rank blocks 40 and at least one of the outer rank blocks 42 being lifting blocks and the other of the outer rank block 42 being a guide block as seen in FIGS. 3 and 4. A small tray 12 is detrayed with base rank block 38 and at least one of the inner rank blocks 40 being lifting blocks and at least one of the inner rank blocks 40 being a guide block as seen in FIGS. 5 and 6. With a small tray, at least one of the outer rank blocks 42 may also be a guide block as seen in FIGS. 5 and 6.

It should be understood that all references to lifting of the article or product from the tray can refer both to having a stationary base with the product on the bottom raised above the base or having a stationary product on the bottom with the tray base lowered from the product. Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A de-traying method for removing articles from trays, the method comprising:
    providing a plurality of trays, each of the trays having a base, a tray rim around said base and an opening in said base and a tray bottom covering said opening, said tray bottom being liftable from said base;
    transporting at least one of said trays that is supporting an article on said tray bottom to a detraying assembly;
    detraying the article at said detraying assembly by elevating said tray bottom at least to the level of said tray rim with an article lifter from below said tray, said article lifter comprising a lifting base and a plurality of lifting blocks fixed to said lifting base, said lifting blocks being sized and arranged such that at least one of said lifting blocks engages said tray bottom through said opening in response to said lifting base being elevated and such that at least one of said blocks is positioned outside of said tray adjacent said tray rim to maintain the orientation of said tray; and
    laterally displacing the article off of the elevated said tray bottom.

2. The de-traying method as claimed in claim 1 wherein said trays are elongated with tray long sides and tray short sides perpendicular to said tray long sides and wherein said openings are elongated with opening long sides parallel to said tray long sides and opening short sides parallel to said tray short sides, and wherein said lifting blocks are sized and arranged to engage said tray bottom through said opening and to maintain the orientation of said tray with at least one of said blocks positioned outside of said tray adjacent said tray rim regardless of the orientation of said tray short side leading or said tray long side leading with respect to the direction of said transporting.

3. The de-traying method as claimed in claim 1 wherein some of said trays are small trays and some of said trays are large trays that are larger than said small trays, wherein said large trays include large tray long sides and large tray short sides, and wherein said small trays include small tray long sides and small tray short sides, and wherein said transporting said at least one tray comprises transporting either at least one of said small trays with either the small tray long side or the small tray short side leading or transporting at least one of said large trays with either the large tray long side or the large tray short side leading.

4. The de-traying method as claimed in claim 3 wherein said small tray long sides are the same length as the large tray short sides, and wherein said small tray short sides are half the length of said large tray long sides, and wherein said opening in said small trays has a length that is the same size as a width of the opening in said large trays.

5. The de-traying method as claimed in claim 1 wherein said transporting comprises transporting with a conveyor, and wherein the conveyor comprises a strip belt conveyor with a plurality of spaced apart narrow belts that are driven at a same speed and said lift blocks being of sizes and arrangement to be between said belts with said lifting base elevated.

6. A de-traying method for removing articles from trays, the method comprising:
    providing a plurality of trays, each of said trays having a base and a tray bottom that is liftable from said base, each of said trays further having a tray rim around said base and an opening in said base that is covered by said tray bottom, some of said trays being large trays and some of said trays being small trays that are smaller than said large trays, said opening in said large trays being larger than said opening in said small trays;
    transporting at least one of said trays comprising either a small try or a large tray that is supporting an article on said tray bottom of said tray to a detraying assembly;
    detraying the article at said detraying assembly by elevating said tray bottom at least to the level of said tray rim with an article lifter from below said tray, said article lifter comprising a lifting base and a plurality of blocks fixed to said lifting base, some of said blocks being lifting blocks that are sized and arranged to engage said tray bottom through said opening in response to said lifting base being elevated and at least one of said blocks being a guide block that is sized and arranged such that said guide block is positioned outside of said tray adjacent said tray rim to maintain the orientation of said tray;
    wherein said blocks are sized and arranged on said lifting base wherein at least two of said blocks are lifting blocks and at least one of said blocks is a guide block whether the article is being detrayed from one of said large trays or one of said small trays and whether the article is being detrayed from said tray being oriented with either a longer side of said tray leading or a shorter side of said tray leading; and
    laterally displacing the article off of the elevated said tray bottom.

7. The de-traying method as claimed in claim 6 wherein said blocks are arranged in ranks with at least one of said blocks being a base rank disposed adjacent a side channel of a conveyor, and wherein at least two of said blocks are of an inner rank with respect to said base rank block with said inner rank blocks being separated from said base rank block either upstream from a direction of transport and/or away from the side channel, and with at least two of said blocks being of an outer rank that are separated from said inner rank blocks either upstream from the direction of transport and/or away from the side channel.

8. The de-traying method as claimed in claim 7 wherein one of said large trays is detrayed with said base rank block, said inner rank blocks and at least one of said outer rank blocks being lifting blocks and the other of said outer rank blocks being a guide block.

9. The de-traying method as claimed in claim 7 wherein one of said small trays is detrayed with said base rank block and at least one of said inner rank blocks being a lifting block and at least one of said inner rank blocks being a guide block.

10. The de-traying method as claimed in claim 9 wherein at least one of said outer rank blocks is a guide block.

11. The de-traying method as claimed in claim 6 wherein said transporting comprises transporting with a conveyor, and wherein the conveyor comprises a strip belt conveyor with a plurality of spaced apart narrow belts that are driven at a same speed and said blocks being of sizes and arrangement to be between said belts with said lifting plate elevated.

12. The de-traying method as claimed in claim 6, wherein said large trays include large tray long sides and large tray short sides, and wherein said small trays include small tray long sides and small tray short sides, and wherein said small tray long sides are the same length as the large tray short sides, and wherein said small tray short sides are half the length of said large tray long sides, and wherein said opening in said small trays has a length that is the same size as a width of the opening in said large trays.

13. A de-traying apparatus adapted to remove articles from a plurality of trays, each of said trays being elongated having a long side and a short side with a base and a tray bottom that is liftable from said base, said tray further including a tray rim around said base and an elongated opening in said base, said tray bottom covering said opening, said apparatus comprising:
an article lifter comprising a lifting base and a plurality of blocks fixed to said lifting base, said blocks being of sizes and arrangement such that at least two of said blocks engage said tray bottom through said opening in response to said lifting base being elevated and such that at least one of said blocks is positioned outside of said tray adjacent said tray rim to maintain the orientation of said tray whether said tray is oriented with its long side leading or its short side leading; and
a conveyor that is adapted to transport said tray to said article lifter with either the long side leading or the short side leading.

14. The de-traying apparatus as claimed in claim 13 wherein said elongated opening in said base having long sides parallel to said tray long sides and short sides parallel to said tray short side.

15. The de-traying apparatus as claimed in claim 13 wherein some of said trays are small trays and some of said trays are large trays that are larger than said small trays.

16. The de-traying apparatus as claimed in claim 13 wherein said conveyor comprises a strip belt conveyor with a plurality of spaced apart narrow belts that are driven at a same speed and said blocks being of sizes and arrangement to be between said belts with said lifting plate elevated.

17. A de-traying apparatus adapted to remove articles from trays, each of said trays having a base and a tray bottom that is liftable from said base, each of said trays further having a tray rim around said base and an opening in said base that is covered by said tray bottom, some of said trays being large trays and some of said trays being small trays that are smaller than said large trays, said opening in said large trays being larger than said opening in said small trays; said apparatus comprising:
a transport that is adapted to transport at least one of said trays that is supporting an article on said tray bottom to a detraying assembly;
said detraying assembly adapted to elevate said tray bottom at least to the level of said tray rim with an article lifter from below said tray, said article lifter comprising a lifting base and a plurality of blocks fixed to said lifting base, some of said blocks being lifting blocks that are sized and arranged to engage said tray bottom through said opening in response to said lifting base being elevated and at least one of said blocks being a guide block that is sized and arranged such that said guide block is positioned outside of said tray adjacent said tray rim to maintain the orientation of said tray;
wherein said blocks are sized and arranged on said lifting base with at least two of said blocks being lifting blocks and at least one of said blocks being a guide block whether the article is being detrayed from one of said large trays or one of said small trays and whether the article is being detrayed from said tray being oriented with a long side leading or a short side leading; and
a diverter laterally displacing the article off of the elevated said tray bottom.

18. The de-traying apparatus as claimed in claim 17 wherein said blocks are arranged in ranks with at least one of said blocks being a base rank, at least two of said blocks being of an inner rank with at least one said blocks of said inner rank being located outwardly in a first direction from said base rank and at least one of said blocks of said inner rank being located outwardly in a second direction from said base rank, wherein said second direction is oriented perpendicular to said first direction, and at least two of said blocks being of an outer rank with at least one of said blocks of said outer rank being located outwardly in said first direction from said inner rank and at least one of said blocks of said outer rank being located outwardly in said second direction from said inner rank.

19. The de-traying apparatus as claimed in claim 18 that is adapted to detray said large trays with said base rank block, said inner rank blocks and at least one of said outer rank blocks being lifting blocks and the other of said outer rank blocks being a guide block.

20. The de-traying apparatus as claimed in claim 18 that is adapted to detray said small trays with said base rank block and at least one of said inner rank blocks being a lifting block and at least one of said inner rank blocks being a guide block.

21. The de-traying apparatus as claimed in claim 20 wherein at least one of said outer rank blocks is a guide block.

22. The de-traying apparatus as claimed in claim 17 wherein said transport comprises a strip belt conveyor with a plurality of spaced apart narrow belts that are driven at a same speed and said blocks being of sizes and arrangement to be between said belts with said lifting plate elevated.

23. The de-traying apparatus as claimed in claim 17 wherein said small trays have a long edge the same as the short edge of said large trays, said small trays have a short edge that is half the long edge of said large trays and said small trays have an opening that is as long as the opening in said large tray opening is wide.

* * * * *